United States Patent Office 3,063,946
Patented Nov. 13, 1962

3,063,946
TIN-ACTIVATED CALCIUM SILICATE PHOSPHOR
Richard W. Mooney, Towanda, Pa., assignor to Sylvania Electric Products Inc., a corporation of Delaware
No Drawing. Filed May 4, 1959, Ser. No. 810,567
4 Claims. (Cl. 252—301.6)

This invention relates to phosphors useful in fluorescent lamps and similar devices, and especially to calcium silicate phosphors.

Tin-activated calcium silicate phosphors fired at temperatures which produce the herein-named beta form of the silicate produce a blue or green light emission on excitation by ultraviolet.

I have discovered that if the calcium silicate is fired at higher temperatures, that is, at temperatures high enough to produce the herein named alpha calcium silicate, called pseudo-wollastonite, a strong yellow light emission is obtained.

I have further discovered that the alpha form of calcium metasilicate ($\alpha$-CaSiO$_3$), activated by tin, has two principal emissive bands, one at 450 millimicrons (m$\mu$) and the other at 562 millimicrons.

The alpha material is formed at temperatures of 2200° F. or higher, in the absence of other divalent cations in the phosphor. However, the temperature of conversion to the alpha form can be raised by the addition of magnesium, for example, by adding MgO to the starting mixture, or reduced by adding strontium or barium, for example, as strontium or barium oxides. The carbonates or fluorides of these divalent metals can also be used.

In general the addition of a divalent cation smaller in size than Ca increases the temperature of conversion, whereas the addition of a divalent cation larger than Ca has the opposite effect.

The addition of BaCO$_3$ or BaF$_2$ is especially effective in promoting the formation of the yellow-emitting $\alpha$-CaSiO$_3$:Sn. However, these additives have a strong sintering or fluxing effect, and therefore must be added with caution. The best yellow-emitting phosphor was obtained by the addition of 0.25 mole BaF$_2$ to tin-activated calcium metasilicate when fired at 2100° F. The excitation spectrum of $\alpha$-CaSiO$_3$:Sn is shifted toward longer wavelengths compared to $\beta$-CaSiO$_3$:Sn and, therefore, is more sensitive to high pressure mercury vapor radiation.

In a similar manner, as the firing temperature exceeds 2200° F. for the calcium orthosilicates, one obtains a yellow-emitting $\alpha'$-Ca$_2$SiO$_4$:Sn instead of the blue-emitting $\beta$-Ca$_2$SiO$_4$:Sn. The $\alpha'$-Ca$_2$SiO$_4$:Sn phosphor has its main emission band at 570 m$\mu$ and, as with $\alpha$-CaSiO$_3$:Sn, the excitation spectrum is shifted toward the visible with a strong absorption band about 333 m$\mu$. The addition of Mg, Zn, Sr, or Ba all tend to promote the transition to the yellow phosphor with Ba being again the most efficient. The optimum Ba concentration was found at 0.075 atom Ba, i.e., with the phosphor Ca$_{1.925}$Ba$_{0.075}$SiO$_4$:Sn. The addition of Ba produces a pronounced increase in the absorption of 333 m$\mu$ radiation. The addition of 0.013 mole of Li$_2$CO$_3$ to a Ba-modified Ca$_2$SiO$_4$ produced an even greater increase in absorption of 333 m$\mu$ radiation. Phosphors fired at 2400° F. display no evidence of fusion even in the presence of well-known fluxes such as Li$_2$CO$_3$, BaCO$_3$, and the like. This lack of fusion is undoubtedly due to the formation of a high temperature form of calcium silicate, specifically $\alpha'$-Ca$_2$SiO$_4$, that is stable at very high temperatures.

The tin content can be within 0.01 mol percent to 0.2 mol percent, and preferably between 0.05 and 0.08 mol percent of the phosphor.

Specific examples of the preparation of these phosphors are described below.

Example 1

The following materials were weighed out into a 2-gallon pebble-mill.

|  | Mole Ratio | Weight, g. |
|---|---|---|
| CaH$_2$SiO$_4$ | 0.75 | 302 |
| BaF$_2$ | 0.25 | 132 |
| SiO$_2 \cdot x$H$_2$O (84.2% SiO$_2$) | 0.45 | 96.3 |
| SnO$_2$ | 0.05 | 22.6 |

Fifteen hundred (1500) ml. of deionized water were added and the mixture was milled for two hours. The resulting slurry was filtered on a Büchner funnel and oven-dried at 110° C. for 16 hours. The cooled filter cake was rolled out and 0.05 mole NH$_4$Cl (8.1 g. NH$_4$Cl) were mixed in by blending. The mixture was then fired in an atmosphere of steam (20 lbs. pressure at a steam valve setting of 0.2), 5 liters per minute of hydrogen, and five liters per minute of nitrogen for three hours at 2100° F. The resulting phosphor was cooled to room temperature in nitrogen.

Example 2

The following materials were weighed out into a 2-gallon pebble-mill.

|  | Mole Ratio | Weight, g. |
|---|---|---|
| CaCO$_3$ | 2.00 | 600.6 |
| SiO$_2 \cdot x$H$_2$O (84.2% SiO$_2$) | 1.05 | 224.7 |
| SnO | 0.03 | 12.1 |

Fifteen hundred (1500) mls. of deionized water were added and the mixture was milled for 2 hours. The resulting slurry was filtered on a Büchner funnel and oven-dried at 110° C. for 16 hours. The cooled filter cake was rolled out and 0.05 mole NH$_4$Cl (8.1 g. NH$_4$Cl) were mixed by blending. The powder mixture was then fired in an atmosphere of steam (20 lbs. pressure at a steam valve setting of 0.2), 5 liters per minute of hydrogen, and 5 liters per minute of nitrogen for 3 hours at 2400° F. The resulting phosphor was cooled to room temperature in nitrogen

Example 3

The following materials were weighed out into a 2-gallon pebble-mill.

|  | Mole Ratio | Weight, g. |
|---|---|---|
| CaCO$_3$ | 1.925 | 579.0 |
| BaCO$_3$ | 0.075 | 44.4 |
| SiO$_2 \cdot x$H$_2$O (90.2% SiO$_2$) | 1.05 | 210.0 |
| SnO | 0.05 | 20.1 |

Fifteen hundred (1500) mls. of deionized water were added and the mixture was milled for 2 hours. The resulting slurry was filtered on a Büchner funnel and oven-dried at 110° C. for 16 hours. The cooled filter cake was rolled out and 0.05 mole NH$_4$Cl (8.1 g. NH$_4$Cl) were mixed by blending. The powder mixture was then fired in an atmosphere of steam (20 lbs. pressure at a steam valve setting of 0.2), 5 liters per minute of hydrogen, and 5 liters per minute of nitrogen for 3 hours at 2400° F. The resulting phosphor was cooled to room temperature in nitrogen.

Example 4

The following materials were weighed out into a 2-gallon pebble-mill.

|  | Mole Ratio | Weight, g. |
|---|---|---|
| $CaCO_3$ | 1.90 | 571.0 |
| $BaCO_3$ | 0.075 | 44.4 |
| $Li_2CO_3$ | 0.013 | 3.0 |
| $SiO_2 \cdot xH_2O$ (90.2% $SiO_2$) | 1.05 | 210.0 |
| $SnO$ | 0.05 | 20.1 |

Fifteen hundred (1500) mls. of deionized water were added and the mixture was milled for 2 hours. The resulting slurry was filtered on a Büchner funnel and oven-dried at 110° C. for 16 hours. The cooled filter cake was rolled out and blended. The resulting powder was fired in an atmosphere of steam (20 lbs. pressure at a steam valve setting of 0.2), 5 liters per minute of hydrogen, and 5 liters per minute of nitrogen for 3 hours at 2400° F. The resulting phosphor was cooled to room temperature in nitrogen.

What I claim is:
1. A yellow luminescent, tin-activated alpha prime calcium orthosilicate phosphor.
2. A yellow luminescent, tin-activated alpha prime calcium orthosilicate phosphor which contains as a partial substitution of calcium atoms, minor quantities of at least one substance selected from the group consisting of magnesium, zinc, barium and strontium and wherein the tin activator content is between about 0.01 to 0.2 mol percent.
3. The phosphor according to claim 2 which further contains lithium carbonate.
4. A yellow emitting, tin-activated alpha calcium metasilicate phosphor containing as a partial replacement of calcium atoms, minor quantities of at least one substance selected from the group consisting of barium and strontium and wherein the tin content is between about 0.01 to 0.2 mol percent.

References Cited in the file of this patent

UNITED STATES PATENTS

| 2,457,054 | Leverenz | Dec. 21, 1948 |
| 2,966,463 | Schaffer et al. | Dec. 27, 1960 |

FOREIGN PATENTS

| 572,771 | Great Britain | Oct. 23, 1945 |